US012786004B2

(12) United States Patent
Pannell et al.

(10) Patent No.: US 12,786,004 B2
(45) Date of Patent: Nov. 3, 2026

(54) COMMUNICATION SYSTEM AND METHOD

(71) Applicant: NXP B.V., Eindhoven (NL)

(72) Inventors: Donald Robert Pannell, Cupertino, CA (US); Bernd Uwe Gerhard Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 290 days.

(21) Appl. No.: 18/766,391

(22) Filed: Jul. 8, 2024

(65) Prior Publication Data

US 2025/0023754 A1 Jan. 16, 2025

(30) Foreign Application Priority Data

Jul. 10, 2023 (EP) .................................... 23184546

(51) Int. Cl.
*H04L 12/40* (2006.01)

(52) U.S. Cl.
CPC .................. *H04L 12/40013* (2013.01); *H04L 2012/40215* (2013.01)

(58) Field of Classification Search
CPC ................ H04L 12/40013; H04L 2012/40215
See application file for complete search history.

(56) References Cited

U.S. PATENT DOCUMENTS 6,067,585 A * 5/2000 Hoang ................ H04L 41/0213 710/14
2003/0214974 A1* 11/2003 Beverly ................ H04L 12/462 370/476
2005/0256975 A1* 11/2005 Kaniz ...................... H04L 49/90 709/229
2010/0071055 A1* 3/2010 Kaniz ................. H04L 63/0485 726/14
2014/0023089 A1* 1/2014 Hartwich ............ H04L 12/4013 370/468
2014/0129748 A1* 5/2014 Muth .................. H04L 12/4135 710/106
2015/0095532 A1* 4/2015 Muth ........................ G06F 3/00 710/105
2016/0080168 A1* 3/2016 Lieder ................... H04L 1/0002 370/468
2018/0234498 A1* 8/2018 Sangameswaran ..... H04L 12/18
2019/0079842 A1* 3/2019 Chae ................... G06F 11/3006
2020/0174055 A1* 6/2020 Pampattiwar ........ B60Q 11/005
2020/0220888 A1* 7/2020 Terazawa .............. B60T 17/221
(Continued)

FOREIGN PATENT DOCUMENTS

CN 111245743 A 6/2020
CN 111464409 A 7/2020
(Continued)

OTHER PUBLICATIONS

Rahmani, Mehrnoush et al., "Traffic Shaping for Resource-Efficient In-Vehicle Communication", IEEE Transactions on Industrial Informatics, Nov. 1, 2009, pp. 414-428, vol. 5, No. 4, IEEE, Piscataway, NJ , USA.

(Continued)

*Primary Examiner* — Jael M Ulysse

(57) ABSTRACT

The present disclosure relates to a system for a communication node at an interface between Ethernet communication and CAN communication, the system and/or method being configured to ensure a small geometric size and prevent loss of data.

20 Claims, 4 Drawing Sheets

(56) References Cited

U.S. PATENT DOCUMENTS

| | | | | |
|---|---|---|---|---|
| 2021/0136182 | A1* | 5/2021 | Jung | H04L 69/18 |
| 2023/0053798 | A1* | 2/2023 | Rennig | G06F 13/28 |
| 2023/0079725 | A1* | 3/2023 | Lee | H04L 12/40<br>726/25 |
| 2024/0168905 | A1* | 5/2024 | Kim | G06F 13/1663 |
| 2024/0243945 | A1* | 7/2024 | Goyal | H04L 12/40 |

FOREIGN PATENT DOCUMENTS

| | | | |
|---|---|---|---|
| EP | 1416762 | A2 | 5/2004 |
| EP | 1416762 | A3 | 5/2004 |
| EP | 4304136 | A1 | 1/2024 |

OTHER PUBLICATIONS

U.S. Appl. No. 18/484,316, filed Oct. 10, 2023, 38 pages.

* cited by examiner

COMMUNICATION SYSTEM AND METHOD

CROSS-REFERENCE TO RELATED APPLICATIONS

This application claims priority under 35 U.S.C. § 119 to European patent application no. 23184546.2, filed Jul. 10, 2023, the contents of which are incorporated by reference herein.

TECHNICAL FIELD

The present disclosure relates to a system and a method.

BACKGROUND

In-vehicle network buses such as Controller Area Network (CAN), CAN with flexible data rate (CAN FD), Local Interconnect Network (LIN), FlexRay, Ethernet-based network buses, and other types can be used for communication in vehicles.

The CAN bus, for example, is a message-based communication bus protocol often used in motor vehicles. However, CAN networks also have applications outside the automotive sector. A CAN bus network can comprise multiple bus devices, called nodes or electronic control units (ECUs), such as an engine control module (ECM), a powertrain control module (PCM), airbags, antilock brakes, cruise control, electric power steering, audio systems, windows, doors, mirror adjustment, battery and charging systems for hybrid/electric vehicles, and more.

The CAN protocol is used to enable communication between the various CAN bus devices. The data link layer of the CAN protocol is standardized as International Standards Organization (ISO) 11898-1:2003. CAN Flexible Data-Rate or "CAN FD", an extension of the standardized CAN data link layer protocol is integrated into the ISO11898-1:2015 standard and provides higher data rates. Another extension, called CAN XL, with a new (optional) layer scheme on the physical layer to enable even higher data rates, is in the definition phase, discussed under CiA610 (CAN in Automation), and is moving towards standardization in the form of ISOI 1898-1:202x.

Ethernet is a well-known networking technology, and the IEEE 802.3 (Institute of Electrical and Electronic Engineers) relates a collection of standards that define the media access control of the physical layer and the data link layer for wired Ethernet. Modern automobiles, for example, contain various electronic control units that communicate with each other over in-vehicle networks (IVNs) such as Ethernet and/or CAN. An emerging IEEE standard that is particularly well suited for in-vehicle networks is IEEE 802.3cg, a specification for 10 megabits per second (Mbits) over simple twisted-pair Ethernet that allows multiple nodes to connect with the same twisted-pair cable, also referred to as "shared media." The IEEE 802.3cg (10BASE-T1) project was created to allow slower devices (less than 100 Mbits) to connect cost-effectively.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of the disclosure are defined in the accompanying claims.

DESCRIPTION OF DRAWINGS

Embodiments of the present disclosure will be described in more detail with reference to the appended drawings. It is to be noted, however, that the appended drawings illustrate only typical embodiments of the present disclosure and are therefore not to be considered limiting of its scope, such that other equally effective embodiments may be implemented. Advantages of the subject matter claimed will become apparent to those skilled in the art upon reading this description in conjunction with the accompanying drawings, in which like reference numerals have been used to designate like elements, and in which:

DESCRIPTION OF EMBODIMENTS

Figure 1:
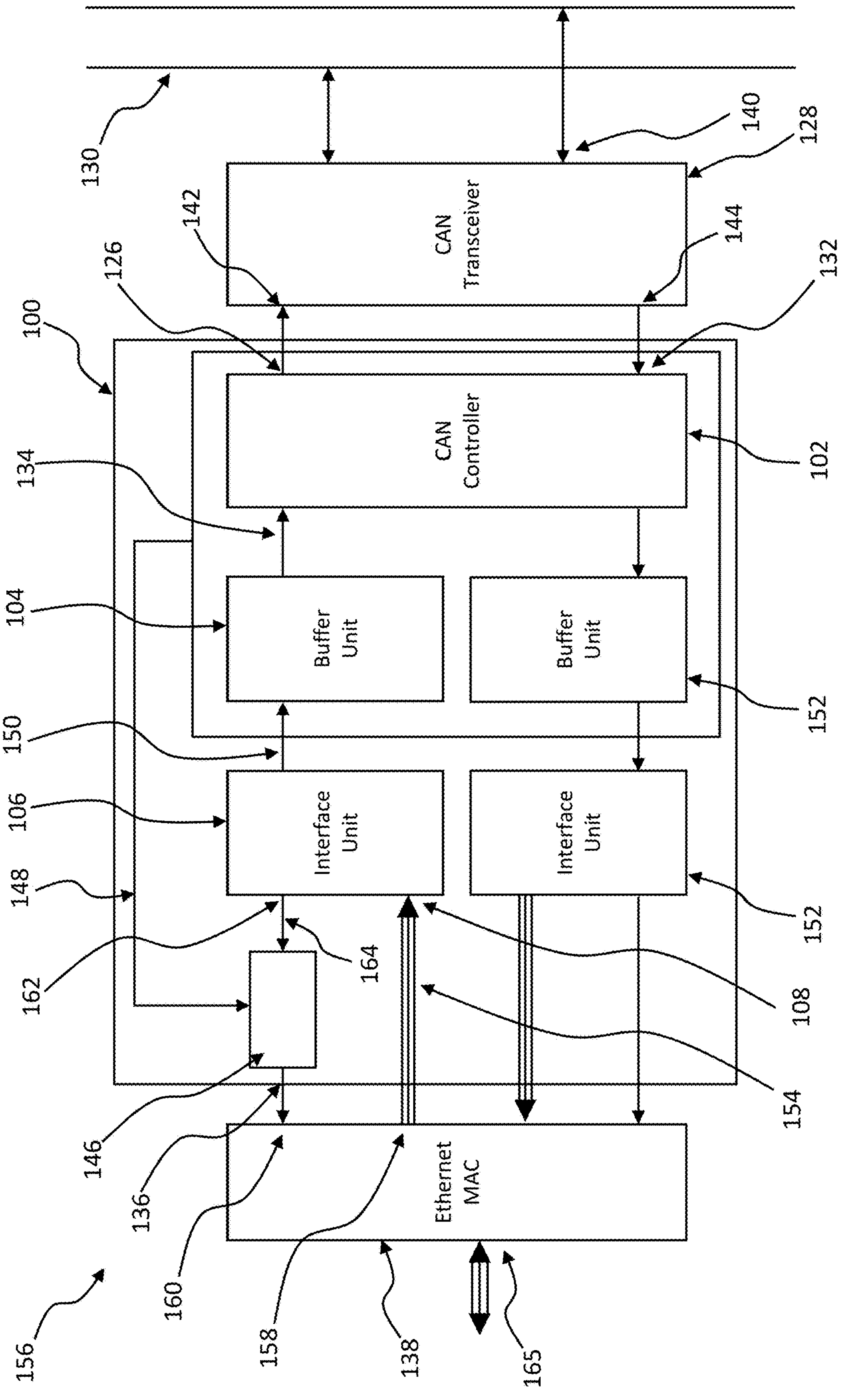
FIG. 1 shows a simplified block diagram of an embodiment the system.

It may be only of moderate effort for a person skilled in the art to connect two nodes of the same technology, such as two CAN nodes or two Ethernet nodes. A challenge may arise if a single node should have the ability to communicate with both an Ethernet network and a CAN network. Such a node shall be able to generate a CAN frame 120, 122, 124 based on an Ethernet frame, and vice versa.

For generating a differential voltage signal on the CAN bus 130 via a CAN transceiver 128, so that the differential voltage signal represents a CAN frame 120, 122, 124 to be transmitted, a so-called arbitration is required by which the access to the CAN bus 130 is allowed or denied. If access to the CAN bus 130 is allowed through the arbitration, the CAN transceiver 128 can generate the previously mentioned differential voltage signal on the CAN bus 130. If access to the CAN bus 130 is denied by the arbitration, the CAN transceiver 128, under control of the CAN controller 102, will stop or not start generating the differential voltage signal to transmit a CAN frame 120, 122, 124 from the time the denial is detected. As a result, the CAN transceiver 128 will not be able to send the CAN frame 120, 122, 124 over the CAN bus 130 directly following the lost arbitration. Rather, the CAN transceiver 128 under the control of the CAN controller 102 would have to repeatedly enter arbitration until permission is granted to access the CAN bus 130.

A node that is intended to have both capabilities, namely to communicate with an Ethernet network and to communicate with a CAN bus 130, may therefore comprise a buffer unit 104 configured to buffer at least one Ethernet frame 110, 114, 118. When the buffer unit 104 receives an Ethernet frame 110, 114, 118 that is to be at least partially converted into a CAN frame 120, 122, 124 in order to send the CAN frame 120, 122, 124 over the CAN bus 130, the received Ethernet frame 110, 114, 118 may be buffered in the buffer unit 104 until access to the CAN bus 130 is allowed. The time before access to the CAN bus 130 is allowed may take a while, so that multiple Ethernet frames 110, 114, 118 may be transmitted to the node before a first CAN frame 120 based on, for example, the first, receiving Ethernet frame 110 is sent over the CAN bus 130.

It might be of interest for anode to be compact in size. This may also apply to a node that is intended to have both capabilities, namely to communicate with an Ethernet network and to communicate with a CAN bus 130. In the prior art, the structural size of a CAN transceiver 128, which may be configured to interface with a CAN bus 130, is typically significantly larger than the structural size of a buffer unit 104. Therefore, in order to integrate both a CAN transceiver 128 and a buffer unit 104 into the same integrated circuit, IC, it may be desirable to limit the capacity for storing data of the buffer unit 104 so that only a few Ethernet frames can be stored by the buffer unit 104. As a result, the buffer unit 104 may not cause a large size of the node.

FIG. 1 schematically illustrates an example embodiment of a system 100. The system 100 may be a part of a communication device 156. The communication device 156 may be a part of a node used for communication in an IVN.

The system 100 comprises a CAN controller 102. The CAN controller 102 may be configured according to the CAN standard such that the CAN controller 102 may support Classical CAN, CAN FD, and/or CAN XL. The CAN controller 102 comprises a transmit data output interface 126, referred to as TXD output interface 126. The TXD output interface 126 can be used to transmit a CAN frame 120, 122, 124 to the CAN transceiver 128. The CAN transceiver 128 may comprise a transmit data input interface 142, referred to as the TXD input interface 142. In an example, the TXD output interface 126 of the CAN controller 102 is coupled to the TXD input interface 142 of the CAN transceiver 128 via a signal connection to transmit CAN frames 120, 122, 124 from the CAN controller 102 to the CAN transceiver 128. The CAN transceiver 128 may be configured to generate, based on a received CAN frame 120, 122, 124, a differential voltage signal at a CAN bus interface 140 representing the received CAN frame 120, 122, 124. The CAN bus interface 140 of the CAN transceiver 128 may be configured to be coupled to the signal lines of the CAN bus 130, such that the differential voltage signal can be transmitted to a remote CAN transceiver (not shown) via the CAN bus 130.

Each CAN frame 120, 122, 124 may be configured according to the CAN standard. In an example, each of the CAN frames 120, 122, 124 is configured as a CAN frame 120, 122, 124 according to Classical CAN, CAN FD, and/or CAN XL.

The CAN controller 102 comprises a receive data input interface 132, also referred to as an RXD input interface 132. The RXD input interface 132 is for receiving a CAN frame 120, 122, 124. The RXD input interface 132 may be coupled to a receive data output interface 144, also referred to as an RXD output interface 144, of the CAN transceiver 128. The CAN transceiver 128 may detect a differential voltage signal representing a CAN frame 120, 122, 124 via the CAN bus interface 140. The CAN transceiver 128 may be configured to transmit a received CAN frame 120, 122, 124 to the RXD input interface 132 of the CAN controller 102 via the RXD output interface 144.

The CAN controller 102 does not have direct access to the CAN bus 130. Rather, the CAN controller 102 may have (indirect) access to the CAN bus 130 via the CAN Transceiver 128. In particular, the CAN controller 102 may (indirectly) access the CAN bus 130 via the signal connection between the TXD output interface 126 and the TXD input interface 142, via another signal connection between the RXD output interface 144 and an RXD input interface 132, and via the CAN transceiver 128 and the associated CAN bus interface 140. The permission to access the CAN bus 130 to send a CAN frame 120, 122, 124 over the CAN bus 31 via a differential voltage signal is limited. According to the CAN standard, a so-called arbitration is performed through of the CAN controller 102 and the CAN transceiver 128, the result of the arbitration being either a positive permission state, according to which the CAN controller 102 is allowed to transmit a CAN frame 120, 122, 124 on the CAN bus via the CAN transceiver 128, or a negative permission state, according to which the CAN controller 102 is not allowed to transmit a CAN frame 120, 122, 124 on the CAN bus 130 via the CAN transceiver 128. For each CAN frame 120, 122, 124, the CAN controller 102 performs the aforementioned arbitration until, as a result, the CAN controller 102 reaches the positive permission state for transmitting the respective CAN frame 120, 122, 124.

The system 100 comprises a unit 106, also referred to as an interface unit 106. The interface unit 106 comprises a transmit data input interface 108, also referred to as a TX input interface 108. The interface unit 106 is configured to receive Ethernet frames 110, 114, 118 via the TX input interface 108. An Ethernet frame 110, 114, 118 may also be referred to as a data frame 110, 114, 118 or Ethernet data frame 110, 114, 118. The interface unit 106 may be configured to be coupled to an Ethernet media access control (MAC) unit 138 via the TX input interface 108. The MAC unit 138 may be configured in accordance with the Ethernet standard, in particular IEEE 802.3. The IEEE 802.3 standard refers to a collection of standards defining physical layer and data link layer media access control for wired Ethernet.

In an example, Ethernet communications refer to the 10BASE-T1S standard as defined by IEEE 802.3cg. The communications are to provide for multiple communication nodes, each communication node being coupled to at least one other communication node via a common communication medium, such as a twisted pair wire, to provide for transmission of Ethernet frames 110, 114, 118 from one communication node to the other communication node. Each Ethernet communication node may comprise a physical layer device, wherein the device is also referred to as a phy or Ethernet transceiver. The Ethernet transceiver may be configured to generate a voltage signal on the communication medium representing an Ethernet packet. The Ethernet transceiver of a communication node may be coupled to a control unit configured to control access to the communication medium. The control unit may also be referred to as the MAC unit 138. The MAC unit 138 may also be referred to as a MAC controller 138 or a transmitter. The MAC unit 138 may be configured to access the communication medium via the Ethernet transceiver. The MAC unit 138 may be configured to react on signals (CRS, COL not shown here) from the interface units 106, 152 to obtain positive permission to access or negative permission (deny access) with respect to the communication medium.

Two communication nodes, each comprising an Ethernet transceiver and a MAC unit 138, may be coupled via a communication medium such that the communication medium extends from the Ethernet transceiver of one communication node to the Ethernet transceiver of the other communication node. One of the transceivers may generate a voltage signal that is transmitted over the communication medium to the other transceiver, wherein the voltage signal represents an Ethernet packet. The transmission over the communication medium extending from an Ethernet transceiver to another Ethernet transceiver may be referred to and/or configured as a media dependent transmission.

The Ethernet MAC 138 may comprise a transmit data output interface 158, which may also be referred to as a TX output interface 158. A signal connection 154 may extend from the TX output interface 158 to the TX input interface 108 of the interface unit 106. The Ethernet MAC 138 may be configured to transmit an Ethernet frame 110, 114, 118 from the TX output interface 158 to the TX input interface 108 of the interface unit 106 via the signal connection 154. The transmission of the Ethernet frame 110, 114, 118 to the TX input interface 108 may be performed serially. As an effect, the transmission on this interface of the Ethernet frame 110, 114, 118 may be independent of the communication medium over which the Ethernet frame 110, 114, 118 is to be transmitted by the Ethernet transceiver. The interface unit 106 may also be independent of the communication mode used to transmit the Ethernet frame 110, 114, 118 over the communication medium. As a result, the interface unit 106 may also be configured as a media independent interface unit 106. In an example, the interface unit 106 may be part of and/or referred to as a MII interface unit 106. However, the interface unit 106 may also be part of and/or refer to other subtypes of a media-independent interface, such as reduced media-independent interface (RMII), gigabit media-independent interface (GMII), reduced gigabit media-independent interface (RGMII), 10-gigabit media-independent interface (XGMII), or serial gigabit media-independent interface (SGMII).

The system 100 further comprises a buffer unit 104. The buffer unit 104 may also refer to as a buffer 104. The interface unit 106 is preferably coupled to the buffer unit 104 via a signal connection 150. The interface unit 106 may transmit an Ethernet frame 110, 114, 118 previously received by the interface unit 106 via the TX input interface 108 to the buffer unit 104. The signal connection 150 may be used for the transmission. The buffer unit 104 is configured to store at least one Ethernet frame 110, 114, 118.

The buffer unit 104 may comprise a predefined, limited capacity for storing data, in particular data of one or more Ethernet frames 110, 114, 118. The capacity for storing data may also be referred to as a reference capacity. The Ethernet frames 110, 114, 118 are preferably configured according to the IEEE 802.3 standard. Each Ethernet frame 110, 114, 118 may comprise multiple fields. In an example, each Ethernet frame 110, 114, 118 comprises a preamble field and a start of frame field, referred to as an SFD field. The preamble field and the SFD field may have a combined data size of 8 bytes. Each Ethernet frame 110, 114, 118 may further comprise an Ethernet Frame field comprising at least a destination address field, a source address field, a type field, a payload field, and a check field also referred to as a frame check sequence. The destination address may comprise 6 bytes, the source address 6 bytes, the type field 2 bytes, the payload field between 46 and 1500 bytes, and the check field 4 bytes of data. Each Ethernet frame 110, 114, 118 may have a minimum size of 64 bytes and/or a maximum size of 1518 bytes. The buffer unit 104 may be configured such that the reference capacity of the buffer unit 104 is configured to store a predefined number of at least one Ethernet frame 110, 114, 118 in accordance with the Ethernet standard, such as IEEE 802.3. The reference capacity may be limited to the data of the predefined number of at least on Ethernet frame 110, 114, 118. In an example, the buffer unit 104 comprises a reference capacity configured to store a predefined number of Ethernet frames 110, 114, 118 each having a maximum data size. The number of Ethernet frames 110, 114, 118 may be, for example, one, two, three, or another natural number. Preferably, the number of Ethernet frames 110, 114, 118 is either one or two. The small number of Ethernet frames 110, 114, 118 that can at maximum be stored by the buffer unit 104 offers the advantage that the buffer unit 104 can be configured to be particularly compact in size. This compact design of the buffer unit 104 is particularly advantageous if the buffer unit 104 comprises the same structural size as the CAN transceiver 128.

The buffer unit 104 is also coupled to the CAN controller 102. In an example, the buffer unit 104 may be coupled to the CAN controller 102 via the signal connection 134. The buffer unit 104 is configured to transmit an Ethernet frame 110, 114, 118 stored by the buffer unit 104 to the CAN controller 102. An Ethernet frame 110, 114, 118 stored by the buffer unit 104 may also be referred to as a buffered Ethernet frame 110, 114, 118. Transferring an Ethernet frame 110, 114, 118 from the buffer unit 104 to the CAN controller 102 may free up the corresponding storage space of the buffer unit 104. In an example, the CAN controller 102 may be configured to read out an Ethernet frame 110, 114, 118 from the buffer unit 104 via the signal connection 134 such that the read out results in the transfer of the Ethernet frame 110, 114, 118 to the CAN controller 102.

The CAN controller 102 is configured to generate a CAN frame 120, 122, 124 based on a received Ethernet frame 110, 114, 118. In this regard, the CAN frame 120, 122, 124 corresponds to a CAN frame according to the CAN standard, like Classical CAN, CAN FD or CAN XL. In an example, the CAN frame may comprise and/or be formed from at least (by) a start of frame (SOF) field, an arbitration field, a control field, a payload field, a CRC field, an acknowledgement (ACK) field, and an end of frame (EOF) field. In an example, the CAN controller 102 may be configured to generate a CAN frame 120, 122, 124 based on the received Ethernet frame 110, 114, 118 such that the payload field of the CAN frame 120, 122, 124 comprises, in particular encompasses, the complete Ethernet frame 110, 114, 118 or only a part of the Ethernet frame 110, 114, 118, for example such as only the payload field of the Ethernet frame 110, 114, 118. If the payload field of the CAN frame 120, 122, 124 comprises the complete Ethernet frame 110, 114, 118, the resulting type of communication may also be referred to as a tunneling of the Ethernet frame 110, 114, 118 via a CAN communication and/or via CAN frames 120, 122, 124.

Previously, it was explained that the CAN controller 102 comprises the TXD output interface 126 for sending a CAN frame 120, 122, 124 via the CAN transceiver 128 such that the CAN transceiver 128 generates a differential voltage signal on the CAN bus 130 representing the CAN frame 120, 122, 124 to be transmitted. The CAN controller 102 is configured to perform what is referred to as arbitration, wherein the result of the arbitration indicates whether the CAN controller 102 is positively allowed to indirectly access the CAN bus 130 to transmit the CAN frame 120, 122, 124 or whether the corresponding access is denied. Access to the CAN bus 130 may be denied if other CAN nodes are already transmitting a CAN frame on the CAN bus 130 or if other CAN nodes have a higher priority to transmit a CAN frame on the CAN bus 130. Therefore, it may take a certain amount of time, also referred to as a waiting time, for the CAN controller 102 to receive a positive permission through arbitration to access the CAN bus 130 via the CAN transceiver 128 to transmit the CAN frame 120, 122, 124.

In the following, reference is made to FIGS. 2 to 6, and the times T0 to T11 mentioned in this context may be transferred from figure to figure in an analogous manner. For example, if a time T0 is introduced in connection with FIG. 5, the same time T0 may also apply to the other FIGS. 2, 3, 4, 6 in an analogous manner.

Figure 5:
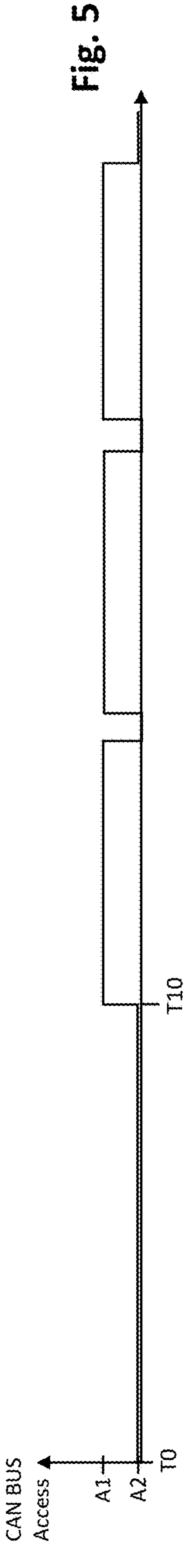

In FIG. 5, a course of the permission state for the CAN controller 102 is schematically shown. The permission state may be either positive (thus a positive permission state A1) or negative (thus a negative permission state A2). In the positive permission state A1, the CAN controller 102 is permitted to access the CAN bus 130 via the CAN transceiver 128. In the negative permission state A2, the CAN controller 102 is not permitted (and/or denied) to access the CAN bus 130 via the CAN transceiver 128. In an example, the permission state relates to the positive/negative permission to transfer a complete CAN frame 120, 122, 124 over the CAN bus 130. In an example, the permission state may not relate to the permission to attend to an arbitration. The result of the arbitration is either the positive permission state A1 or the negative permission state A2. As schematically indicated in FIG. 5, the negative permission state A2 exists between the time T0 and time T10, so that the CAN controller 102 is not allowed to access the CAN bus 130 via the CAN transceiver 128 during the time period T0 to T10. From time T10 the permission to access the CAN bus is allowed.

Figure 2:
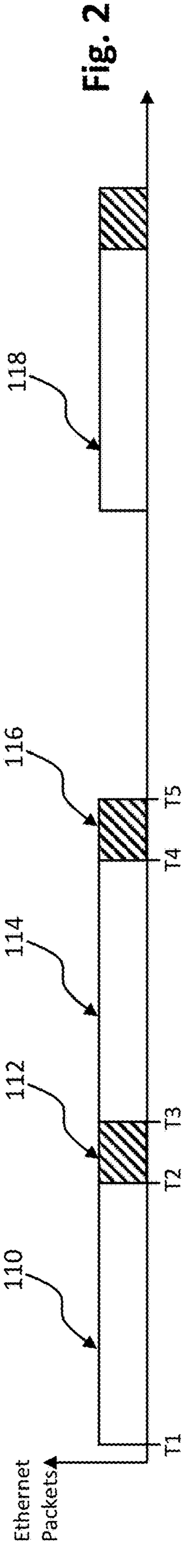
FIGS. 2 to 6 show simplified signal diagrams.

In FIG. 2, an example of the course of the transmission of Ethernet frames 110, 114, 118 from the MAC unit 138 to the interface unit 106 is schematically shown. The MAC unit 138 may be configured to transmit a first Ethernet frame 110 to the interface unit 106 in the time period from time T1 to time T2. From the interface unit 106, the first Ethernet frame 110 may be transmitted to the buffer unit 104, wherein the buffer unit 104 stores the first Ethernet frame 110. In an example, the MAC unit 138 comprises a control interface 160. Via the control interface 160, the MAC unit 138 may receive a signal referred to as a TX reference rate signal. The TX reference rate signal may be and/or represent a transmission rate, also referred to as a reference transmission rate, at which the MAC unit 138 has to transmit data of an Ethernet frame 110, 114, 118 from the TX output interface 158 to the TX input interface 108 of the interface unit 106 via the signal connection 154. The MAC unit 138 may therefore be configured to adjust the transmission rate of the data of an Ethernet frame 110, 114, 118 at the TX output interface 158 based on the TX reference rate signal so that the transmission rate (of the data of the Ethernet frames 110, 114, 118) matches the reference transmission rate.

The system 100 is configured to generate the TX reference rate signal. The system 100 further comprises the interface 136, referred to as the TX rate interface 136. The system 100 is configured to transmit the TX reference rate signal via the TX rate interface 136. In an example, the TX rate interface 136 is coupled to the control interface 160 of the MAC unit 138 via a signal connection such that the system 100 can transmit the TX reference rate signal to the control interface 160 of the MAC unit 138. The TX reference rate signal may be used by the system 100 to control the rate of transmission of data from the Ethernet frames 110, 114, 118 to the TX input interface 108.

Previously, it was explained as an example that the buffer unit 104 may comprise the same structure size as the CAN transceiver 128, so that the buffer unit 104 and the CAN transceiver 128 and the CAN controller 102 may be integrated into the same integrated circuit, IC. Because of this relationship, in an example, the capacity of the buffer unit 104 to store Ethernet frames 110, 114, 118 may be limited. In an example, the buffer unit 104 may be configured to store a maximum of two Ethernet frames 110, 114, 118.

Referring to FIG. 5, it was also previously explained that the permission state of the CAN controller 102 between time T0 and time T5 is a negative permission state A2, such that the CAN controller 102 does not have positive permission to access the CAN bus 130 via the CAN transceiver 128. The first Ethernet frame 110, which is transmitted to the buffer unit 104 via the interface unit 106 and stored by the buffer unit 104 in the time period T1 to T2, can therefore not be transferred to and/or retrieved by the CAN controller 102 in the time period T0 to T10. The first Ethernet frame 110 must therefore remain stored in the buffer unit 104.

During the transmission of the Ethernet frames 110, 114, 118 to the TX input interface 108, each Ethernet frame 110, 114, 118 is followed by a so-called gap 112, 116 which is also referred to as inter-frame gap 112, 116 or inter-packet gap 112, 116. During the gap 112, 116 no transmission of data of an Ethernet frame 110, 114, 118 takes place. Referring to FIG. 2, an example is shown wherein a first gap 112 is performed directly after the transmission of the first Ethernet frame 110 and the transmission of the second Ethernet frame 114 is performed directly after the first gap 112. The transmission of the second Ethernet frame 114 may be followed directly by a second gap 116.

In an example, the buffer unit 104 comprises a reference capacity for storing only two Ethernet frames 110, 114. With the transmission of the first Ethernet frame 110 to the interface unit 106 and the subsequent transmission of the first Ethernet frame 110 from the interface unit 106 to the buffer unit 104, a corresponding portion of the reference capacity of the buffer unit 104 is occupied by the data of the first Ethernet frame 110. The portion of the reference capacity of the buffer unit 104 occupied by data from at least one Ethernet frame 110, 114, 118 may be referred to in an example as the fill level of the buffer unit 104. In an example, the remaining portion of the reference capacity of the buffer unit 104 that is not occupied by data from at least one Ethernet frame 110, 114, 118 may be referred to as the remaining capacity of the buffer unit 104 or the free capacity of the buffer unit 104. In an example, a threshold fill level may be predefined and/or stored by the CAN controller 102. The threshold fill level of the buffer unit 104 may correspond to a (theoretical and/or predefined) fill level of the buffer unit 104 with (theoretically) stored data at which the remaining free portion of the reference capacity, in particular the remaining capacity, is less than the amount of data of a single Ethernet frame according to the IEEE 802.3 standard. In another example, the threshold fill level of the buffer unit 104 may correspond to the (theoretical and/or predefined) fill level of the buffer unit 104 with (theoretical) stored data at which the remaining free portion of the reference capacity is configured to store a predefined portion of the data of a single Ethernet frame according to the IEEE 802.3 standard, such as the IEEE 802.3cg standard. For example, the predefined portion may be between 1% and 99%, in particular between 10% and 80%.

Figure 6:
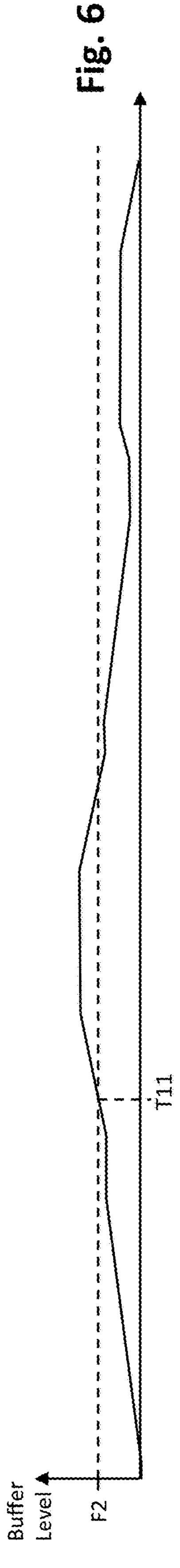

In FIG. 6, an example of a course of the fill level of the buffer unit 104 is schematically shown. From time T1 on, the fill level of the buffer unit 104 increases. The increase of the fill level of the buffer unit is caused by the transmission of the first Ethernet frame 110 while the CAN controller 102 has a negative permission state A2. During the period T2 to T3, the fill level of the buffer unit 104 remains at the same level. The first gap 112 is followed directly by the transmission of the second Ethernet frame 114, so that the fill level of the buffer unit 104 continues to increase from time T3 on. At the time T11, the fill level of the buffer unit 104 reaches the predefined threshold fill level F2. By reaching the threshold fill level F2, it is clear in an example that the remaining capacity of the buffer unit 104 is so small, that no further complete Ethernet frame 118 shall be received by the interface unit 106 until the fill level of the buffer unit 104 drops below the threshold fill level F2 again. Just the second Ethernet frame 114 may be continued to be transmitted to the interface unit 106 and indirectly to the buffer unit 104.

The system 100 is configured to generate the TX reference rate signal representing the reference transmission rate of data of an Ethernet frame 110, 114, 118 to the TX input interface 108. The system 100 is configured to generate the TX reference rate signal depending on the fill level of the buffer unit 104 and/or a permission state of the CAN controller 102. The reference transmission rate may also be referred to as the TX transmission rate. The TX transmission rate is the rate at which the data of an Ethernet frame 110, 114, 118 is to be transmitted to the TX input interface 108. If the fill level of the buffer unit 104 is low and/or less than the threshold fill level F2, the TX transmission rate may be high, in particular a predefined maximum transmission rate. If the fill level of the buffer unit 104 reaches and/or is greater than the threshold fill level F2, it may be necessary for the TX transmission rate to be or become small, in particular to become zero at the next gap 112, 116.

Figure 3:
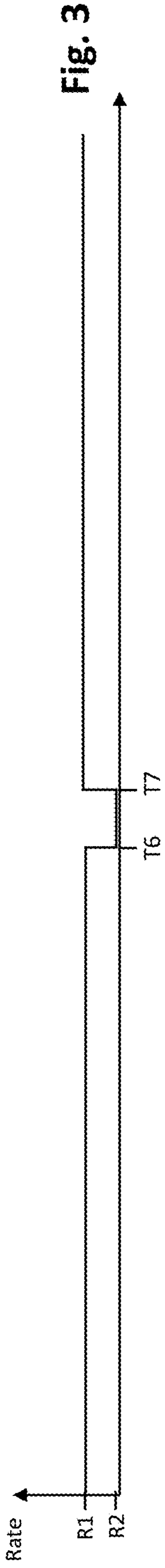

In an example, the CAN controller 102 may be coupled to the buffer unit 104 such that the CAN controller 102 can detect the fill level of the buffer unit 104. In an example, the system 100 and/or the CAN controller 102 may be configured to set the TX transmission rate to a first predefined transmission rate R1 if the detected fill level of the buffer unit 104 is less than the threshold fill level. The first predefined transmission rate R1 may also be referred to as the first transmission rate R1. In FIG. 3, an example of the course of the TX transmission rate is schematically shown. Preferably, the first transmission rate R1 is a predefined maximum allowable transmission rate for transmitting data of an Ethernet frame 110, 114, 118 to the TX input interface 108. For example, the first transmission rate R1 may be 10 Mbits, 25 Mbits, or 100 Mbits. In an example, the system 100 and/or the CAN controller 102 may be configured to set the TX transmission rate to a second predefined transmission rate R2 if the detected level of the buffer unit 104 reaches or exceeds the threshold fill level. The second predefined transmission rate R2 may also be referred to as the second transmission rate R2. The second transmission rate R2 is less than the first transmission rate R1. In an example, the second transmission rate R2 may be zero. In another example, the second transmission rate R2 may be less than 70%, less than 50%, less than 30%, or less than 10% of the first transmission rate R1.

As previously discussed, in an example, the CAN controller 102 may be coupled to the buffer unit 104 such that the CAN controller 102 can detect the fill level of the buffer unit 104. Further, the CAN controller 102 may be coupled to the buffer unit 104 such that the CAN controller 102 can detect the time of transmission of data of an Ethernet frame 114 from the interface unit 106 to the buffer unit 104. In an example, based on the detected data of the Ethernet frame 114 from the interface unit 106 to the buffer unit 104, the CAN controller 102 may be configured to detect a start time T3 at which the transmission of data of an Ethernet frame 114 to the interface unit 106 begins and/or an end time T4 at which the transmission of data of the Ethernet frame 114 to the interface unit 106 ends. The CAN controller 102 may be configured to determine, based on the start time T3 and/or the end time T4, a gap 116 that directly follows to the end time T4 of the transmission of the Ethernet frame 114 to the interface unit 106.

In another example, the CAN controller 102 may be (indirectly) coupled to the interface unit 106 via the buffer unit 104 such that the CAN controller 102 can detect the time of transmission of the data of an Ethernet frame 114 to the TX input interface 108 of the interface unit 106. In an example, the CAN controller 102 may be (indirectly) coupled to the interface unit 106 via the buffer unit 104 such that the CAN controller 102 can detect the start time T3 of an Ethernet frame 114, the end time T4 of an Ethernet frame, and/or the gap 116. In an example, the CAN controller 102 may be configured to determine the time period T4 to T5 of the gap 116 based on the detected end time T4.

In an example, the CAN controller 102 may be configured to set the TX transmission rate to the second transmission rate R2 only at a time T6 during a gap 116 if the fill level of the buffer unit 104 has previously reached or exceeded the threshold fill level. In an example, the CAN controller 102 may be configured to determine the gap 116 following the Ethernet frame 114 transmitted to the TX input interface 108 during which transmission the fill level of the buffer unit 104 reached the threshold fill level F2. In an example, the CAN controller 102 may detect the time T11 at which the fill level of the buffer unit 104 reaches the threshold fill level F2. Further, the CAN controller 102 may detect the end time T4 of the Ethernet frame 114 which data is transmitted to the TX input interface 108 during a transmission period T3 to T4, wherein the time T11 at which the fill level of the buffer unit 104 reached the threshold fill level F2 falls within the transmission period T3 to T4.

In an example, after the CAN controller 102 detects the time T11 at which the fill level of the buffer unit 104 reaches the threshold fill level F2, the CAN controller 102 may be configured to detect the next possible gap 116 following in time T11. Further, the CAN controller 102 may be configured to set the TX transmission rate to the second transmission rate R2 at a time T6, where the time period T6 is during the detected gap 116.

As a technical effect, after detecting the time T11 and/or detecting that the fill level of the buffer unit 104 reached the threshold fill level F2, the CAN controller 102 may first wait to reach time T6 in the next gap 116 and set the TX transmission rate to the second transmission rate R2 at the time T6 in the gap 116. Thus, the TX transmission rate may not be reduced directly at the time T1, when the fill level of the buffer unit 104 reaches the threshold fill level, but only afterward at time T6. This prevents the TX transmission rate from changing, in particular from being set to zero, during an active transmission of data of an Ethernet frame 114. As a technical effect, this prevents data of an Ethernet frame 114 from being lost.

As a further technical effect, data of a (further) Ethernet frame 118 can be prevented from being transmitted to the interface unit 106 while the remaining capacity of the buffer unit 104 is no longer sufficient to store the data of the (further) Ethernet frame 118. As can be seen from FIG. 6, the remaining capacity decreases between time T6 and time T7, so that the fill level of the buffer unit 104 reaches at time T7 the threshold fill level F2, and even decreases further afterwards. The CAN controller 102 may be configured to detect if the fill level is less than the threshold fill level F2. The CAN controller 102 may be configured to set the TX transmission rate back to the first transmission rate R1, if the CAN controller 102 detects that the fill level of the buffer unit 104 is less than the threshold fill level F2. The change from the second transmission rate R2 to the first transmission rate R1 is shown schematically in FIG. 3 at time T7.

In an example, the preceding explanations, preferred features, technical effects, and/or advantages as discussed in connection with the fill level may be combined with a permission state of the CAN controller 102 for controlling the TX transmission rate.

In an example, the system 100 and/or the CAN controller 102 is configured to set the TX transmission rate to the first transmission rate R1 if both of the following conditions are met: (1) the fill level of the buffer unit 104 is less than the threshold fill level; and (2) the CAN controller 102 is in a positive permission state.

In an example, the system 100 and/or the CAN controller is configured to set the TX transmission rate to the second transmission rate R2 if at least one of the following two conditions is met: (1a) the buffer unit fill level has reached or exceeded the threshold fill level; (2a) the CAN controller 102 is in a negative permission state.

In an example, the CAN controller 102 may be configured to set the TX transmission rate to the second transmission rate R2 only at a time T6 during a gap 116 after at least one of the following two conditions is met: (1a) the buffer unit fill level has reached or exceeded the threshold fill level; (2a) the CAN controller 102 is in a negative permission state. For condition (1a), reference is made to the preceding explanations in an analogous manner. In an example, the CAN controller 102 may be configured to determine the gap 116 directly following the Ethernet frame 114 transmitted to the TX input interface 108 during the transmission of which at least one of the two conditions (1a), (2a) is met. In an example, the CAN controller may determine the time at which the negative permission condition occurs. In an example, the negative permission state may occur if the CAN controller 102 has lost an arbitration. In another example, the negative permission state may occur if the CAN controller does not have and/or lost permission to access the CAN bus 130 via the CAN transceiver 128 due to a traffic shaping policy. Other examples of denying the CAN controller 102 to access the CAN bus 130 via the CAN transceiver 128 can be derived from the standards for Classical CAN, CAN FD, and/or CAN XL.

In an example, the TX reference rate signal is a clock signal. For example, the TX reference rate signal may be and/or represent a clock frequency or the clock rate at which data is to be transmitted to the TX input interface 108. The TX reference rate signal is transmitted from the system 100 via the TX rate interface 136 to the control interface 160 of the MAC unit 138, which, based on the clock frequency or the clock rate, adjusts the transmission rate of the data from the TX output interface 158 to the TX input interface 108 of the interface unit 106 so that the transmission rate corresponds to the clock frequency or the clock rate. In an example, to reduce a transmission rate of data of an Ethernet frame 110, 114, 118 from the TX output interface 158 to the TX input interface 108, the clock rate and/or the clock frequency may be reduced. It is possible to continuously decrease the clock rate and/or clock frequency. However, it had been found advantageous if the second transmission rate R2 is zero, so that in this case the clock frequency and/or clock rate are also zero. The transition from the first transmission rate R1 to the second transmission rate R2, if any of the aforementioned conditions are met, is preferably performed during the gap 116, in particular at time T6.

Figure 4:
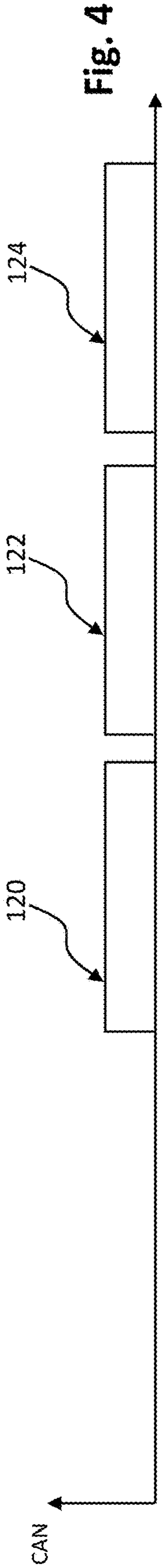

In an example, each Ethernet frame 110, 114, 118 transmitted from the MAC unit 138 to the TX input interface 108 of the interface unit 106 is an Ethernet frame 110, 114, 118. As a technical effect, the system 100 may be configured to generate and transmit a CAN frame 120, 122, 124 based on an Ethernet frame 110, 114, 118 over the CAN bus 130. FIG. 4 schematically illustrates an example of the course of the CAN frames 120, 122, 124 to be transmitted.

In an example, the interface unit 106 may be configured to receive data of an Ethernet frame 110, 114, 118 serially at the TX input interface 108. Thus, the data may be transmitted bit by bit. Further, the MAC unit 138 may be configured to serially transmit the data of an Ethernet frame 110, 114, 118 from TX output interface 158 to TX input interface 108.

In an example, the interface unit 106 and/or the buffer unit 104 may be configured to transmit a complete Ethernet frame 110, 114, 118, in particular as a bundle, from the interface unit 106 to the buffer unit 104. In other words, in an example, the data of an Ethernet frame 110, 114, 118 may be transmitted in parallel from the interface unit 106 to the buffer unit 104. As a technical effect, the data of an Ethernet frame 110, 114, 118 may be transmitted non-serially from the interface unit 106 to the buffer unit 104 in an example.

Figure 7:
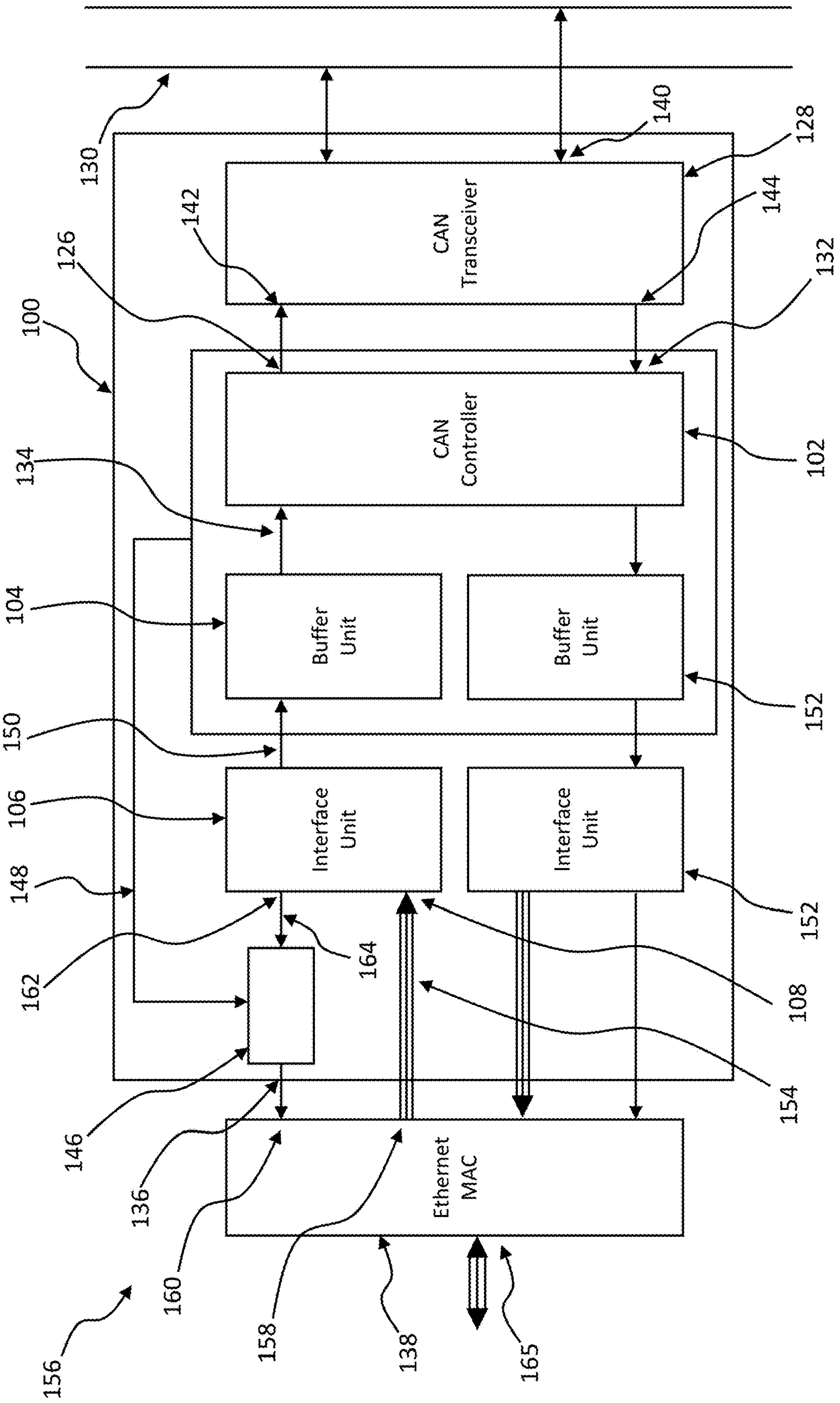
FIG. 7 shows another simplified block diagram of another embodiment of the system.

FIG. 7 schematically illustrates another embodiment of the system 100. For the system 100 of FIG. 7, reference is made to the preceding explanations, preferred features, technical effects and advantages in an analogous manner as explained for the system 100 in connection with FIGS. 1-6.

The system 100 may further comprise, in an example, the CAN transceiver 128. The CAN transceiver 128 comprises a CAN bus interface 140. The CAN bus interface 140 may comprise two terminals. The CAN transceiver 128 may be configured to generate a differential voltage signal at the CAN bus interface 140, in particular between the two terminals of the CAN bus interface 140, the differential voltage signal may represent a CAN frame 120, 122, 124. Using the differential voltage signal, the CAN frame 120, 122, 124 can be transmitted to another node (not shown) via the CAN bus 130.

The CAN transceiver 128 may comprise a TXD input interface 142 coupled to the TXD output interface 126 of the CAN controller 102. The CAN transceiver 128 may also comprise an RXD output interface 144 coupled to the TXD input interface 132 of the CAN controller 102.

In an example, the CAN transceiver 128, the CAN controller 102, and the buffer unit 104 are integrated into a single integrated circuit, IC. The integration of the CAN transceiver 128 in the same IC in which the CAN controller 102 and the buffer unit 104 are integrated offers the advantage that the system 100 is particularly compact in size. However, the structure size of the integrated circuit in this case may be determined by the structure size of the CAN transceiver 128. In an example, in order to prevent the system 100 from assuming particularly large geometric dimensions, it may be provided that the reference capacity of the buffer unit 104 is limited. For example, the reference capacity of the buffer unit 104 may be limited such that the buffer unit 104 can store a maximum of three Ethernet frames 110, 114, 118, a maximum of two Ethernet frames 110, 114, 118, or a maximum of only one Ethernet frame 110, 114, 118.

In another example, the interface unit 106 may further be integrated into the integrated circuit that also integrates the CAN transceiver 128, the CAN controller 102, and the buffer unit 104.

In an example, the interface unit 106 may not be able to detect the level of the buffer unit 104. As can be seen from the embodiments of FIGS. 1, 7, the interface unit 106 may comprise a (further) interface 162, referred to as the base interface 162.

In an example, the interface unit 106 is configured to generate a signal referred to as a TX base rate signal. The TX base rate signal may be predefined and/or represent a maximum allowable transmission rate for transmitting data to the TX input interface 108. The maximum allowable transmission rate for the TX input interface 108 may also be referred to as the transmission control rate. In an example, the interface unit 106 is configured to generate the TX base rate signal independent of a fill level of the buffer unit 104 and/or independent of a permission state of the CAN controller 102.

In an example, the system 100 comprises another unit 146 referred to as a rate control unit 146. The rate control unit 146 may be coupled to the interface unit 106. In an example, the rate control unit 146 may be integrated into a signal connection 164 extending from the base interface 162 to the TX rate interface 136. Thus, the base rate signal is transmitted to the rate control unit 146. In an example, the rate control unit 146 is configured to generate and transmit the TX reference rate signal to the TX rate interface 136. As a technical effect, the TX reference rate signal generated by the rate control unit 146 may be transmitted to the control interface 160 of the MAC unit 138 via the TX rate interface 136.

In an example, the rate control unit 146 is configured to generate the TX reference rate signal from the TX base rate signal depending on a fill level of the buffer unit 104 and/or depending on a permission state of the CAN controller 102. In an example, the rate control unit 146 may be configured as a controllable switch, such as a controllable MOS FET. In an example, if it is determined by the CAN controller 102 that the fill level of the buffer unit 104 has reached the threshold fill level, the CAN controller 102 may control the rate control unit 146 via the signal connection 148 (extending from the CAN controller 102 to the rate control unit 146) such that the rate control unit 146 disconnects the signal connection 164, in particular via the switchable switch. As a technical effect, a TX reference rate signal having a clock frequency and/or a clock rate of zero is thereupon present at the TX rate interface 136. Due to such a TX reference rate signal, the MAC unit 138 will not transmit further data of an Ethernet frame from the TX output interface 158 to the TX input interface 108. In other words, by interrupting the signal connection 164 in an example, the second predefined transmission rate R2 may be achieved. The rate control unit 146 is configured to transmit the corresponding TX reference rate signal through the TX rate unit 146, for example to set the TX reference rate to the first transmission rate R1. In another example, if the CAN controller 102 determines that the fill level of the buffer unit 104 is less than the threshold fill level, the CAN controller 102 may control the rate control unit 146 via the signal connection 148 such that the rate control unit 146 restores the signal connection 164, in particular via the switchable switch. As a technical effect, closing the switchable switch may restore the TX transmission rate to the first, predefined transmission rate R1, which preferably corresponds to the maximum, allowable transmission rate and/or the maximum transmission control rate. In other words, the first, predefined transmission rate R1 may be represented by the base rate signal. When the signal connection 164 is restored by the rate control unit 146, the TX reference rate signal corresponds to the base rate signal. Subsequently, the TX reference rate signal corresponding to the base rate signal is transmitted to the control interface 160 of the MAC unit 138. The MAC unit 138 will then resume transmitting Ethernet frames 110, 114, 118 from the TX output interface 158 to the TX input interface 108.

As previously discussed, the interface unit 106 may be not configured to detect the level of the buffer unit 104. However, in an example, the CAN controller 102 is configured may be configured to detect the level of the buffer unit 104. The CAN controller 102 may further be configured to control the rate control unit 146. As a result, the system 100 may be used to temporarily prevent further Ethernet frames from being transmitted from a MAC unit 138 to the interface unit 106, in case the free capacity of the buffer unit 104 is too low. As a technical effect, the geometric size of the system 100 may be kept compact while effectively preventing Ethernet frames 110, 114, 118 from being lost.

Figure 8:
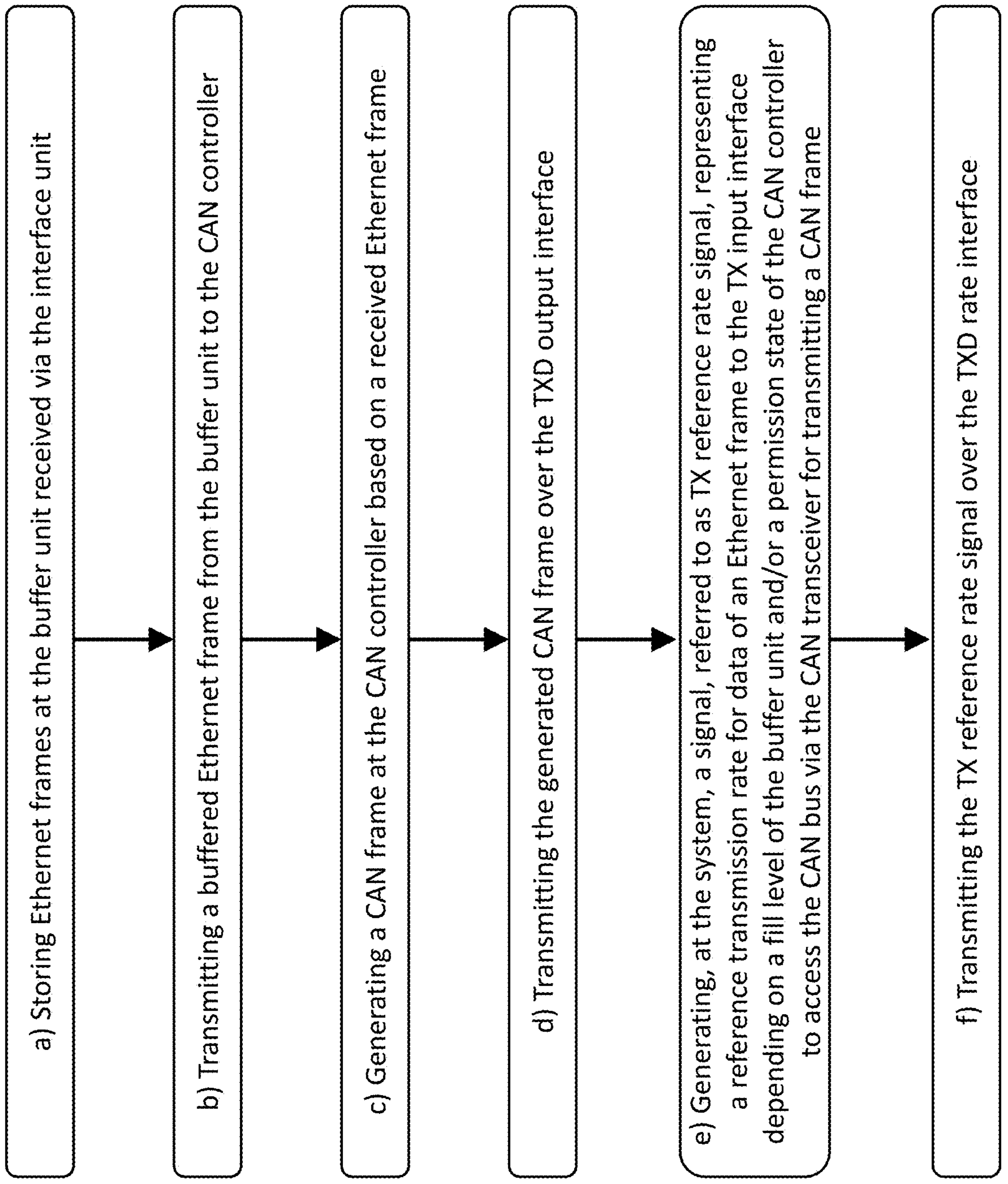
FIG. 8 shows a simplified flow chart of an embodiment of the method.

FIG. 8 schematically illustrates one embodiment for a method for the system 100.

For the method, reference is made to the preceding explanations, preferred features, technical effects and advantages in an analogous manner as explained for the system 100.

In an example, the method may comprise the steps of.

a) Storing Ethernet frames at the buffer unit received via the interface unit, b) Transmitting a buffered Ethernet frame from the buffer unit to the CAN controller, Generating a CAN frame at the CAN controller based on a received Ethernet frame, d) Transmitting the generated CAN frame over the TXD output interface, e) Generating, at the system, a signal, referred to as TX reference rate signal, representing a reference transmission rate for data of an Ethernet frame to the TX input interface depending on a fill level of the buffer unit and/or a permission state of the CAN controller to access the CAN bus via the CAN transceiver for transmitting a CAN frame, and f) Transmitting the TX reference rate signal over the TX rate interface.

Although the described exemplary embodiments disclosed herein focus on devices, systems, and methods for using same, the present disclosure is not necessarily limited to the example embodiments illustrate herein.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A system comprising:

a controller area network, CAN, controller, a buffer unit, and an interface unit corresponding to a media independent interface, MII, unit, wherein the interface unit comprises a transmit data, TX, input interface configured to receive Ethernet frames, wherein the interface unit is coupled to the buffer unit and configured to transmit an Ethernet frame received over the TX input interface to the buffer unit, wherein the buffer unit is configured to store an Ethernet frame of the Ethernet frames received via the interface unit, wherein the buffer unit is coupled to the CAN controller and is configured for transmitting a buffered Ethernet frame to the CAN controller, wherein the CAN controller is configured to generate a CAN frame based on a received Ethernet frame, wherein the CAN controller comprises a transmit data, TXD, output interface for transmitting CAN frames via a CAN transceiver to a CAN Bus, wherein the CAN controller comprises a receive data, RXD, input interface for receiving CAN frames via the CAN transceiver from a CAN Bus, wherein the system is configured to generate a TX reference rate signal representing a TX transmission rate, corresponding to a reference transmission rate, for data of an Ethernet frame to the TX input interface of the interface unit depending on a fill level of the buffer unit and/or a permission state of the CAN controller to access the CAN bus via the CAN transceiver for transmitting a CAN frame, and wherein the system comprises a TX rate interface for sending the TX reference rate signal.

2. The system of claim 1, wherein the TX reference rate signal is a clock signal.

3. The system of claim 1, wherein the system is configured to couple the TX input interface of the interface unit and the TX rate interface to an Ethernet Media Access Controller, MAC.

4. The system of claim 1, wherein the interface unit is configured to serially receive each Ethernet frame at the TX input interface.

5. The system of claim 1, wherein the system is configured to set the TX transmission rate to a predefined first transmission rate if the fill level of the buffer unit is less than a predefined threshold fill level.

6. The system of claim 5, wherein the buffer unit comprises a reference capacity to store a predefined number of at least one Ethernet frame according to the IEEE 802.3 standard, and wherein the threshold fill level of the buffer unit corresponds the fill level of the buffer unit with stored data at which the remaining free portion of the reference capacity is less than the data of a single Ethernet frame according to the IEEE 802.3 standard.

7. The system of claim 6, wherein the system comprises a CAN transceiver, wherein the CAN transceiver comprises a CAN bus interface, which is configured to couple the CAN transceiver to a CAN bus, wherein the CAN transceiver comprises a TXD input interface, which is coupled to the TXD output interface of the CAN controller, wherein the CAN transceiver comprises a RXD output interface, which is coupled to the RXD input interface of the CAN controller, wherein the CAN transceiver, the CAN controller, and the buffer unit are integrated in a single integrated circuit, IC, and wherein the buffer unit is configured such that the reference capacity is limited to store a maximum of three Ethernet frames, in particular a maximum of a single Ethernet frame, in the buffer unit.

8. The system of claim 7, wherein the interface unit is configured to generate a TX base rate signal representing a transmission control rate, corresponding to a maximum transmission rate, that is predefined for the TXD input interface of the CAN transceiver, wherein the system comprises a rate control unit coupled to the interface unit such that the TX base rate signal is transmitted to the rate control unit, wherein the rate control unit is configured to generate the TX reference rate signal from the TX base rate signal depending on the fill level of the buffer unit and/or a permission state of the CAN controller to access the CAN bus via the CAN transceiver for transmitting a CAN frame, and wherein the rate control unit is configured to transmit the TX reference rate signal via the TX rate interface.

9. The system of claim 8, wherein the interface unit is configured to generate the TX base rate signal independent of the fill level of the buffer unit.

10. The system of claim 8, wherein the CAN controller is coupled to the buffer unit such that the CAN controller can detect the fill level of the buffer unit, and wherein the CAN controller is coupled to the rate control unit, wherein the CAN controller is configured to control the rate control unit depending on the detected fill level of the buffer unit and/or a permission state of the CAN controller to access the CAN bus via the CAN transceiver for transmitting a CAN frame.

11. The system of claim 5, wherein the first transmission rate is a maximum transmission rate predefined for the TX input interface of the interface unit.

12. The system of claim 5, wherein the system is configured to set the TX transmission rate to a predefined second transmission rate if the fill level of the buffer unit reaches and/or exceeds the threshold fill level, wherein the second transmission rate is less than the first transmission rate.

13. The system of claim 12, wherein the second transmission rate is less than 70%, 50%, 30% or 10% of the first transmission rate.

14. The system of claim 12, wherein the second transmission rate is zero.

15. A method for a system comprising a controller area network, CAN, controller, a buffer unit, and an interface unit corresponding to a media independent interface, MII, unit, wherein the interface unit comprises a transmit data, TX, input interface for receiving Ethernet frames, wherein the interface unit is coupled to the buffer unit and configured to transmit an Ethernet frame received via the TX input interface to the buffer unit, the buffer unit being coupled to the CAN controller, the CAN controller comprising a transmit data, TXD, output interface for transmitting CAN frames, the CAN controller comprising a receive data, RXD, input interface for receiving CAN frames, the system comprising a TX rate interface, the method comprising:

storing Ethernet frames at the buffer unit received via the interface unit, transmitting a buffered Ethernet frame from the buffer unit to the CAN controller, generating a CAN frame at the CAN controller based on a received Ethernet frame, transmitting the generated CAN frame over the TXD output interface, generating, at the system, a TX reference rate signal representing a TX transmission rate, corresponding to a reference transmission rate, for data of an Ethernet frame to the TX input interface of the interface unit depending on a fill level of the buffer unit and/or a permission state of the CAN controller to access the CAN bus via a CAN transceiver for transmitting a CAN frame, and transmitting the TX reference rate signal over the TX rate interface.

16. The method of claim 15 further comprising serially receiving each Ethernet frame at the TX input interface of the interface unit.

17. The method of claim 16 further comprising setting the TX transmission rate to a predefined first transmission rate by the system if the fill level of the buffer unit is less than a predefined threshold fill level.

18. The method of claim 17, wherein the buffer unit comprises a reference capacity to store a predefined number of at least one Ethernet frame according to the IEEE 802.3 standard, and wherein the threshold fill level of the buffer unit corresponds the fill level of the buffer unit with stored data at which the remaining free portion of the reference capacity is less than the data of a single Ethernet frame according to the IEEE 802.3 standard.

19. The method of claim 18, wherein the method further comprises setting the TX transmission rate to a predefined second transmission rate by the system if the fill level of the buffer unit reaches and/or exceeds the threshold fill level, wherein the second transmission rate is less than the first transmission rate.

20. The method of claim 19, wherein the system comprises a rate control unit; the rate control unit being coupled to the interface unit, wherein the method further comprises:

generating a TX base rate signal at the interface unit, wherein the TX base rate signal representing a transmission control rate, corresponding to a maximum transmission rate, that is predefined for a TXD input interface of the CAN transceiver;

transmitting the TX base rate signal from the interface unit to the rate control unit;

generating, by the rate control unit, the TX reference rate signal from the TX base rate signal depending on the fill level of the buffer unit and/or a permission state of the CAN controller to access the CAN bus via the CAN transceiver for transmitting a CAN frame; and transmitting, by the rate control unit, the TX reference rate signal via the TX rate interface.

* * * * *